United States Patent [19]

Patel et al.

[11] 4,188,514
[45] Feb. 12, 1980

[54] TELESCOPING DISCONNECT SWITCH WITH GASKETED COVERED ACCESS PORT

[75] Inventors: Jayant M. Patel, Cincinnati, Ohio; Jerome K. Wolfe, Murrysville; Paul P. Koren, North Strabane Township, Washington County, both of Pa.

[73] Assignee: Westinghouse Electric Corp., Pittsburgh, Pa.

[21] Appl. No.: 956,815

[22] Filed: Nov. 1, 1978

[51] Int. Cl.² .................... H02B 1/08; H01H 9/02; H01H 31/00

[52] U.S. Cl. .................. 200/48 R; 200/302; 200/303; 277/230; 277/236

[58] Field of Search ............... 200/48 R, 163, 164 R, 200/293, 302, 303; 361/332, 333, 335

[56] References Cited

U.S. PATENT DOCUMENTS

| | | | |
|---|---|---|---|
| 2,145,720 | 1/1939 | Giegerich | 200/163 X |
| 2,229,006 | 1/1941 | Rudd | 200/48 R |
| 3,573,343 | 4/1971 | De Smidt et al. | 200/303 X |
| 3,632,915 | 1/1972 | Kramer | 200/48 R |

*Primary Examiner*—Stephen Marcus
*Attorney, Agent, or Firm*—Robert E. Converse, Jr.

[57] ABSTRACT

An isolated phase bus disconnect switch has a cylindrical center conductor coaxially disposed in a cylindrical conductive housing having an access port. The edges of the port which are perpendicular to the housing have a conductive gasket of tinned copper braid bolted thereto. A curved conductive cover has a rubber gasket attached to its edges. The cover is removably secured to the housing by a plurality of hold-down hinges attached to the housing which supply sufficient pressure to the cover to seal the rubber gasket and produce electrical contact between the cover and the housing. The electrical path from housing to gasket to cover to gasket to housing eliminates the electrical discontinuity caused by the access port, thus preventing destructive electrodynamic forces between the center conductor and the housing.

9 Claims, 10 Drawing Figures

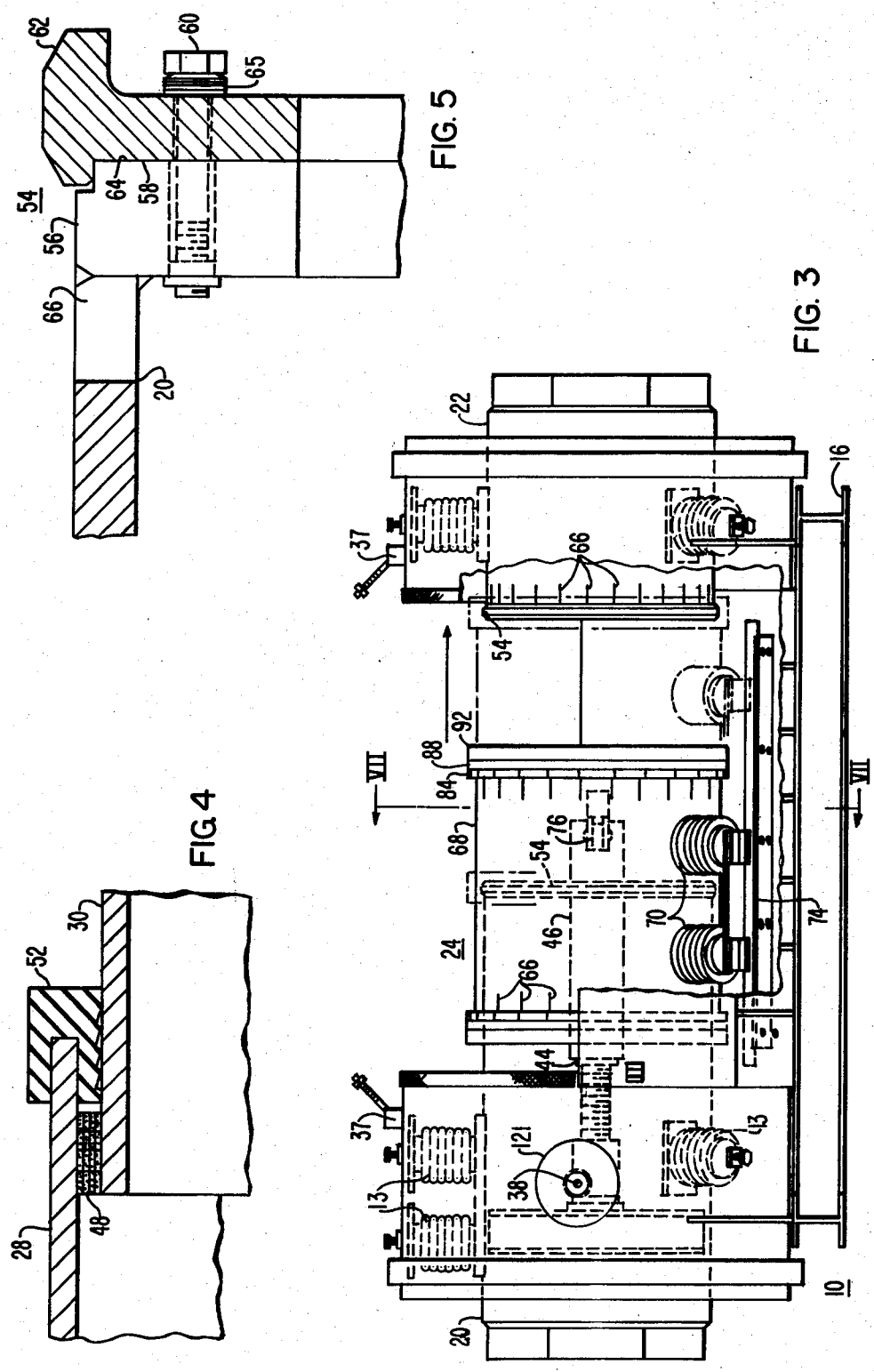

TELESCOPING DISCONNECT SWITCH WITH GASKETED COVERED ACCESS PORT

CROSS-REFERENCE TO RELATED APPLICATIONS

The present invention is related to material disclosed in the following copending U.S. patent applications, all of which are assigned to the assignee of the present invention: Ser. No. 801,122, "High Current Contact" (W.E. 47,168) filed May 27, 1977 by J. R. Meyer; Ser. No. 956,817, "Telescoping Disconnect Switch With RailMounted Telescope Section" (W.E. 48,263) filed Nov. 1, 1978 by J. M. Patel, J. K. Wolfe, F. E. Coyle, and J. R. Farley; Ser. No. 956,818, "Telescoping Disconnect Switch With Low Resistance Center Conductor" (W.E. 48,265) filed Nov. 1, 1978 by J. M. Patel and J. R. Farley; and Ser. No. 956,819, "Telescoping Disconnect Switch With High Current Contact System" (W.E. 48,264) filed Nov. 1, 1978 by J. M. Patel, J. K. Wolfe, and F. E. Coyle.

BACKGROUND OF THE INVENTION

1. Field of the Invention

The invention relates generally to electrical switches and, more particularly, to high voltage, high current disconnect switches suitable for use in isolated phase bus duct.

2. Description of the Prior Art

In order to efficiently supply electrical energy to consumers, utility companies employ large generators typically having capacities of several hundred million watts. This energy can be generated most efficiently at medium voltages of, for example, 22,000 volts. However, it is stepped up by transformers to much higher voltages in order to most economically transmit the energy over long distances. The connection between the generator and the step-up power transformer is usually made by isolated phase bus duct consisting of a plurality of phase conductors each having an inner conductor and a coaxial outer conductive housing.

There are, of course, many protective devices employed on the typical electric utility transmission and distribution system. However, the last line of defense to protect a generator against overload damage is a circuit breaker in the isolated phase bus duct run which isolates the generator in case of a short circuit or fault in the step-up transformer. Due to the high energy flow which must be interrupted during fault conditions, circuit breakers often require extensive maintenance following such interruption operations.

To facilitate this maintenance, disconnect switches are typically provided on either side of the circuit breaker to isolate the breaker from any source of high potential. The disconnect switches are not required to interrupt normal load current but may be called upon to interrupt the rather sizable magnetizing current of the transformer.

One of the primary requirements of a disconnect switch for use in isolated phase bus duct is that it exhibit low losses under normal circuit conditions. This is desirable not only to avoid unnecessary waste of valuable electrical energy but to reduce heating caused by current flow through high resistance connections. Such heat can be extremely destructive to the switch, the bus, and associated apparatus. In addition, the switch must provide reliable operation when called upon even after long periods of inactivity, and must have the ability to withstand the extremely high electrodynamic forces produced by high fault current conditions. A switch must also provide convenient means for inspection and maintenance while at the same time maintaining the electrical integrity of the switch during normal operating conditions.

Prior art disconnect switches have been used in isolated phase bus applications. It would be desirable, however, to provide a switch having a higher degree of reliability and withstand capability, while at the same time reducing the cost of the switch.

SUMMARY OF THE INVENTION

In accordance with the preferred embodiment of the present invention, there is provided a telescoping disconnect switch for isolated phase bus duct which comprises a cylindrical housing of conductive material, a first fixed cylindrical center conductor coaxially disposed within the housing and electrically insulated therefrom, and a second fixed cylindrical center conductor coaxially disposed within the housing and axially spaced from the first center conductor to provide an isolating air gap. A movable telescoping conductor member coaxially disposed within the housing is provided to cooperate with the two center conductors to perform a switching function therewith.

An access port is provided in the housing to permit inspection and maintenance of the telescoping unit. A curved cover of conductive material is removably attached over the access port portion of the cover and housing having a highly conductive plating. The cover is held in electrical contact with the housing by a conductive gasket of plated metal braid disposed between plated portions of the housing and the cover. Means are provided to apply contact pressure upon the cover, the conductive gasket, and the housing to provide a low resistance electrical path therethrough.

BRIEF DESCRIPTION OF THE DRAWINGS

FIG. 3 is a side view, with access cover removed, of the switch shown in FIG. 1;

FIG. 4 is a detail sectional view of the housing of the switch shown in FIGS. 1 through 3, showing the multiple gaskets;

FIG. 5 is a detail sectional view of an end of the fixed conductors of the switch shown in FIGS. 1 through 3;

DESCRIPTION OF THE PREFERRED EMBODIMENT

Figure 1:
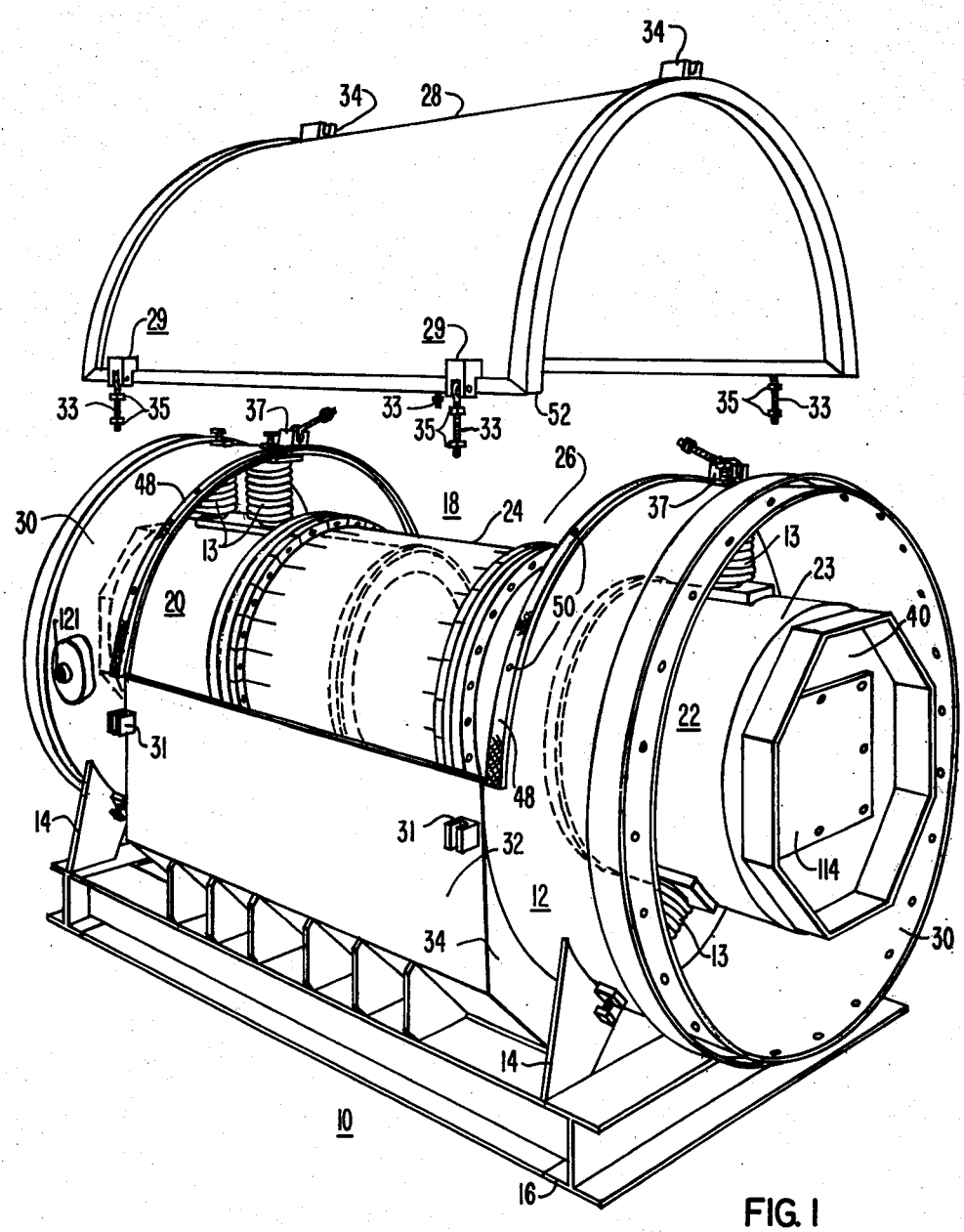
FIG. 1 is a perspective view of one phase switch of a multiphase telescoping disconnect switch assembly constructed in accordance with the principles of the present invention.

Referring now to the drawings, in which corresponding reference characters refer to corresponding members, there is shown in FIG. 1 a perspective view of one phase switch 10 of a three-phase telescoping disconnect switch assembly constructed in accordance with the principles of the present invention. The switch 10 comprises a generally cylindrical housing 12 constructed of aluminum. The housing 12 is welded to support plates 14 which are in turn attached to a structural supporting framework 16. The switch 10 also comprises a center conductor assembly 18 coaxially mounted within the housing 12 and electrically insulated therefrom by porcelain insulators 13. The center conductor assembly 18 comprises first and second fixed center conductor members 20 and 22 adapted for electrical connection to the center conductor of adjacent isolated phase bus duct, and a telescoping sleeve assembly 24 axially movable to connect and disconnect the first and second fixed conductor members.

As can be seen, the switch 10 includes a maintenance and inspection port 26 having a removable aluminum access cover 28. The housing 12 comprises a pair of ring members 30 connected by a supporting pan 32 welded at each edge of the port 26 and at the bottom of the rings 30. An aluminum plate 34 is welded at each end of the pan 32 to the corresponding ring 30 to seal the bottom portion of the housing 12.

The cover 28 includes four hold-down hinges 29, one at each corner, which provide inward radial pressure on the enclosure rings 30. Each hold-down hinge 29 comprises a slotted block 31 welded to the pan 32 and a bolt 33 pivotally attached to the cover 28. A pair of nuts 35 are threaded onto the bolt and may be tightened against the top and bottom of the slotted block 31 to provide a rigid hinge point. The hold-down hinges 29 on either side of the cover 28 may then be loosened to allow the cover 28 to be opened about the pivots of the two tightened hold-down hinges on the opposite side. Two additional mounting fittings 37 similar to the hinges 29 are provided at the top of the two rings 30 to cooperate with blocks 34 on the cover 28 to prevent bending of the member 10 due to axial stress along the top of the housing 12 and cover 28.

Figure 2:
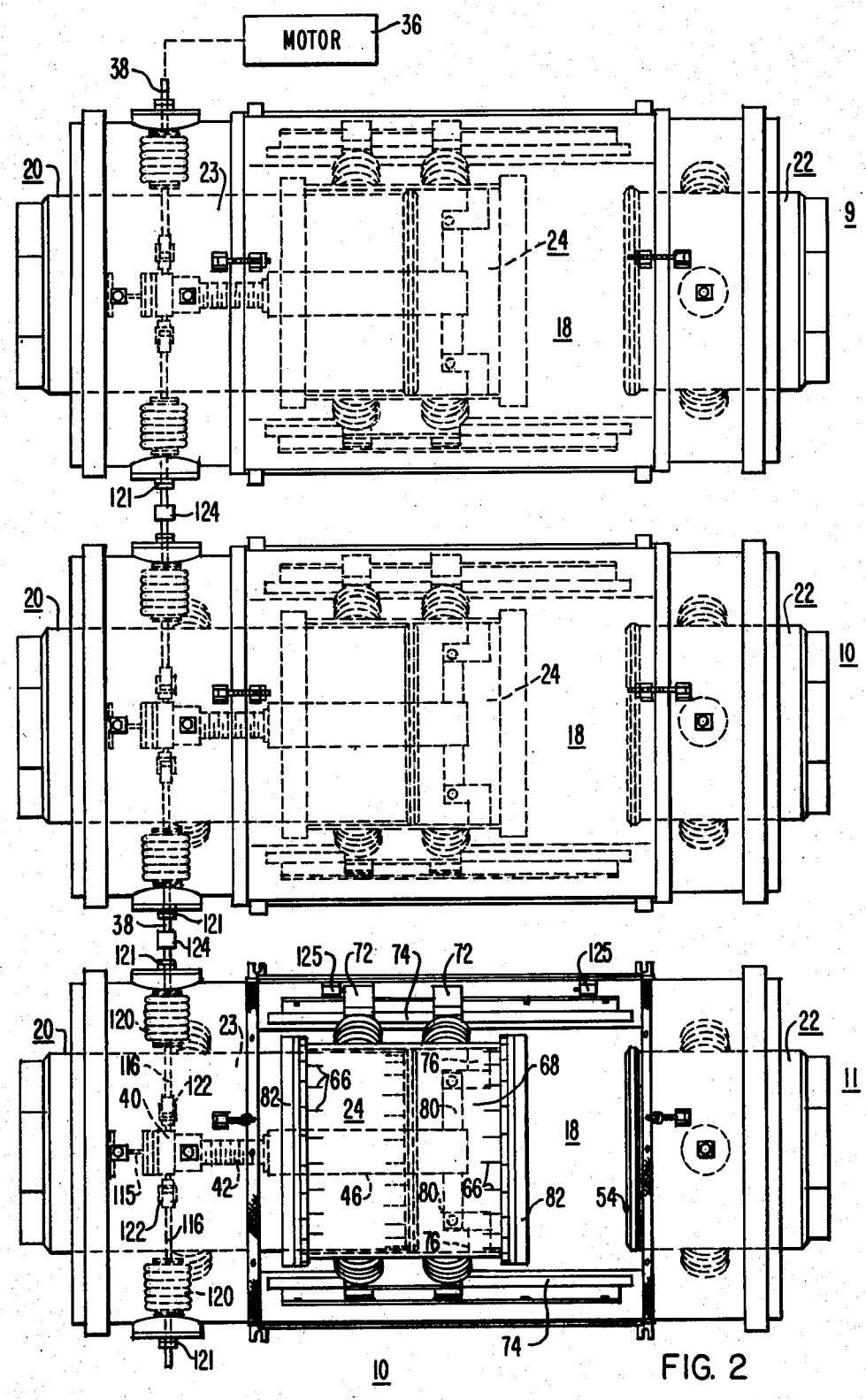
FIG. 2 is a top view of a three-phase switch assembly constructed in accordance with the principles of the present invention.
Figure 7:
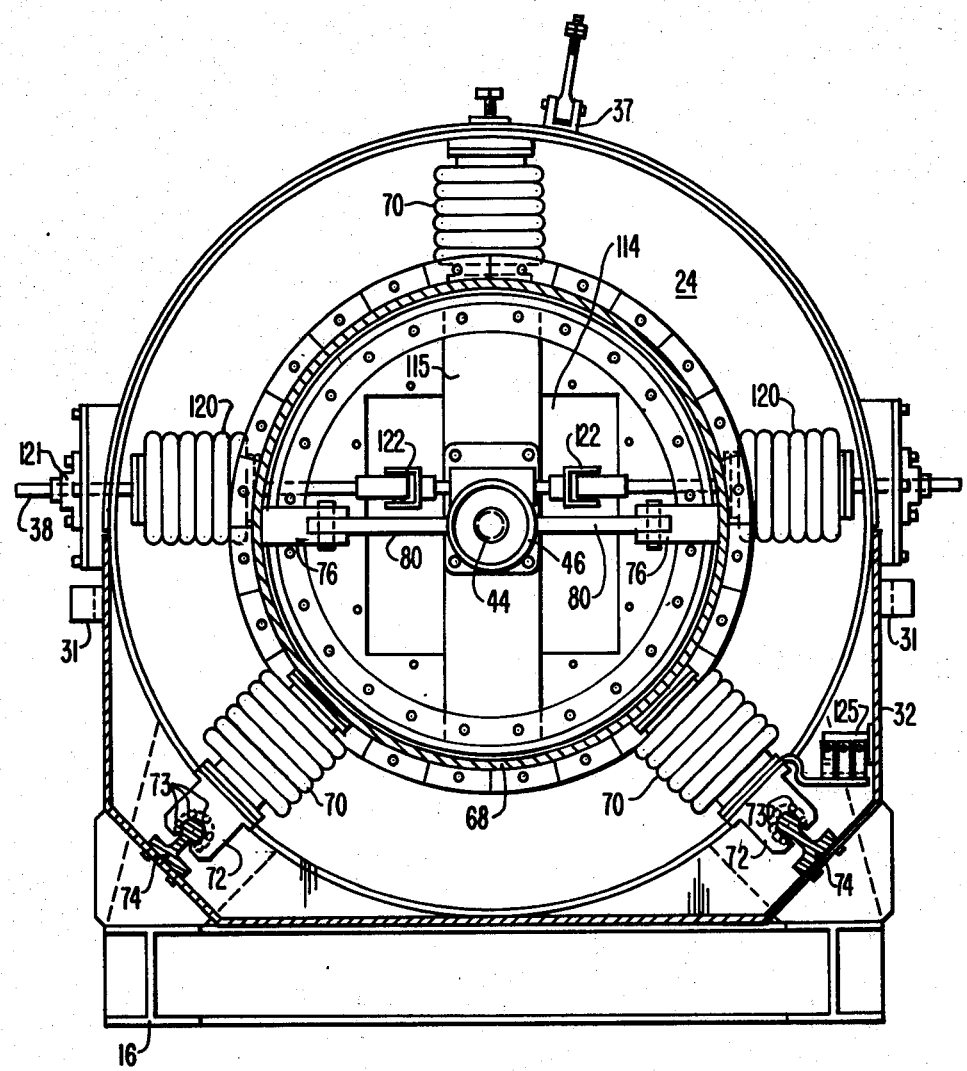
FIG. 7 is a sectional view of the switch shown in FIGS. 1 through 6, taken along the line VII—VII of FIG. 3.

FIG. 2 shows the three-phase telescoping disconnect switch assembly comprising three individual phase switches 9, 10, and 11 which may be supported on the framework 16 (FIGS. 1 and 3) at an elevated level. Motor drive means shown schematically at 36 are coupled to drive shafts 38 which extend outward from the individual phase switches 9, 10, and 11. The switch is activated by energization of the motor drive means which causes rotation of the drive shaft 38 to operate right-angle worm drive mechanisms 40 in the interior of each of the phase switches 9, 10, and 11. The worm drives 40 cause rotation of jack screws 42 positioned substantially along the axis of each of the phase switches 9, 10, and 11. The jack screws 42 each engage a threaded member 44 attached to a tube 46 which is supported in the interior of the telescoping sleeve 24 as shown in FIGS. 2, 3, and 7.

The access port 26 (FIG. 1) in the housing 12 results in a discontinuity or non-uniform distribution of current flowing in the housing, causing an electrodynamic force to act between the housing 12 and the center conductor 18. Normally, at rated continuous current this force is relatively small and well within the structural capability of the switch components. Under a major fault condition, however, the conductor current can rise to a peak value of as much as fifty times the normal current. The forces acting upon the conductors in disconnect switches having such non-uniform current distribution can thus reach tremendous magnitudes for a brief period of time, on the order of a cycle or so, and extensive damage can result.

In order to avoid the electrical discontinuity produced by the access port 26, and to seal the housing 12 against dust, water, and other contaminants, a double gasketing system is provided. As shown in FIGS. 1 and 4, an electrically conducting gasket 48 is secured to the ring 30 at the two edges of the port 26 which are perpendicular to the axis of the switch 10. The conducting gasket 48 is composed of tinned copper braid and is secured to the ring 30 by bolts 50. Although tinned copper braid is utilized in the disclosed embodiment, other types of coated conductive braided material can be used, so long as the materials chosen are electrochemically compatible with the material of the cover 28 and ring 30 to avoid galvanic corrosion.

A sealing gasket 52 of neoprene rubber is fitted over all four edges of the cover 28, as shown in FIGS. 1 and 4. When the cover 28 is seated snugly against housing 12 by action of the hold-down hinges 29, the neoprene gasket 52 is compressed between the cover 28 and the housing 12 to provide a weatherproof seal. The compressive force also provides secure electrical contact at many points between the cover 28 and the braid 48, and the braid 48 and the enclosure ring 30. Thus, there is no appreciable discontinuity in current flow from one end of the switch 12 to the other, over the access port 26. A good electrical connection is achieved due to the multitude of contact points between the numerous strands of wire in the braid and by silver plating the ends of the cover 28 and rings 30 which are in contact with the plated copper braid.

By using the four hold-down hinges and the plated copper braid, the need for numerous screws or bolts to fasten the cover and maintain electrical contact is eliminated, thus greatly simplifying maintenance procedures.

As can be seen in FIG. 3, each of the fixed conductor members 20 and 22 comprises an aluminum cylinder 23 and a stationary contact ring assembly 54, the construction of which can be seen more clearly in the sectional view of FIG. 5. Since each ring assembly 54 is a mirror image of the other, only one such ring assembly, associated with the first fixed conductor member 20 will be described. Welded to the end of the cylinder 23 is an aluminum support ring 56, the outer surface 58 of which is silver plated. Fixedly attached to the support ring 56 by bolts 60 is an annular silver plated copper contact ring 62. A plurality of Belleville washers 65 on the bolts 60 ensure a low resistance contact between the aluminum support ring 56 and the copper contact ring 62 when the bolts 60 are tightened.

If the interface between the aluminum and copper rings 56 and 62 is motionless, the integrity of the low resistance contact between the plated surfaces is maintained. However, copper and aluminum have substantially different coefficients of thermal expansion and on large conductors carrying currents of the magnitude contemplated, measurable differential expansion occurs, subjecting the electrical joint (at the surfaces 58 and 64) to motion. This problem is minimized by cutting axial slots 66 in the aluminum conductors 20 and 22 and rings 56 right up to the aluminumcopper interface. The slots are calculated in circumferential spacing and length to reduce the motion between the copper and aluminum rings to a negligible value by allowing the aluminum between the slots 66 to flex, and to permit the flexing of the aluminum to be well within the elastic deformation range of the aluminum. The result is an aluminum-silver-silver-copper interface that retains the current carrying capabilities of the joint by reducing the relative motion between the components, despite the effects of differential thermal expansion.

Figure 6B:
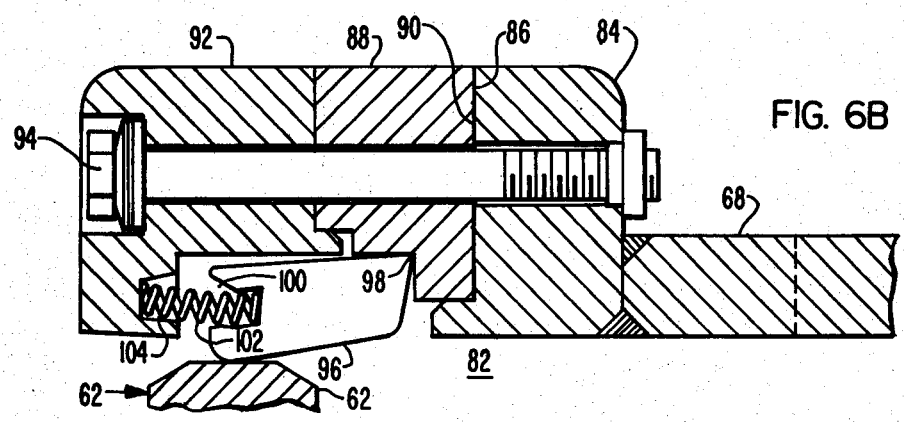
FIG. 6B is similar to FIG. 6A taken along the line VIB—VIB to show a contact finger.
Figure 6:
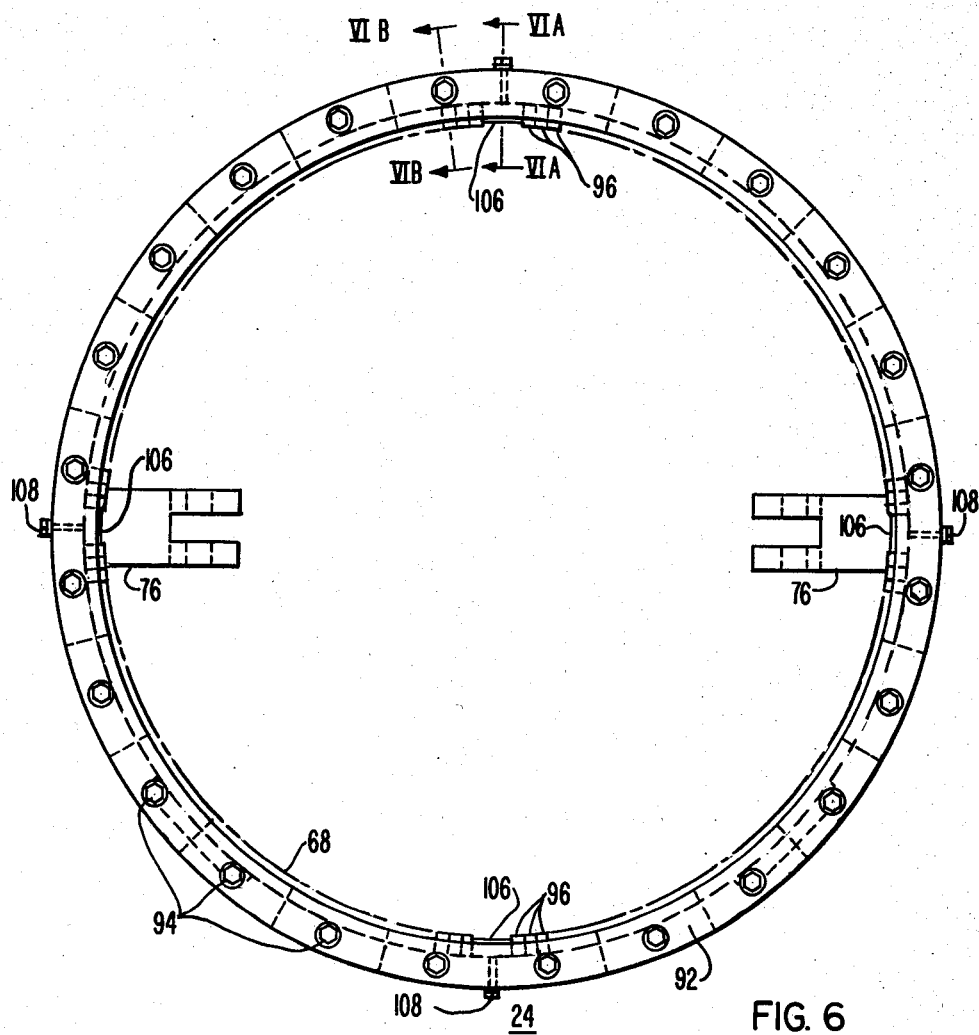
FIG. 6 is an end view of the telescoping sleeve assembly of the switch shown in FIGS. 1 through 5.

The construction of the telescoping sleeve assembly 24 is shown more clearly in FIGS. 6 and 7. An aluminum cylinder 68 is supported upon insulators 70, each of which has a pillow block 72 attached thereto. The pillow blocks 72 contain ball bearings 73 and ride upon rails 74 secured to the housing 12 and parallel to the axis of the switch. The pillow blocks 72 and rails 74 thus form linear bearings. Normally, linear bearings and rails employ hardened steel rails such as case hardened 8620 alloy or 440 stainless for the bearings to roll upon. However, hardened steel is ferro-magnetic and in the presence of the magnetic field due to normal 20,000 ampere operating currents within the switch, high electrical losses result causing severe heating problems. Therefore, the rails 74 are constructed of austenitic stainless steel, such as Grade 303. The pillow block bearings 73 quickly roll a groove into the rails, allowing the ball bearing point load to redistribute over the groove area in contact with the ball. The stainless steel then work-hardens on the surface of the groove from the cold deformation of the rolling ball bearings. The combination of increased area and work-hardening results in an initial groove formation followed by no further deterioration. Although the precision of the bearing system is slightly less than would be the case with hardened magnetic steel, it is more than adequate for the tolerances required in the telescope and contact system.

A pair of connecting blocks 76 (FIG. 7) welded to one end of the interior of the cylinder 68 support the tube 46 which has arms 80 welded thereto. The arms 80 are bolted between the connecting blocks 76 such that the tube 46 is parallel to the axis of the switch. The threaded member 44 engages the jack screw 42 to permit movement of the telescope sleeve 24 along the rails 74.

Each end of the telescope cylinder 68 includes a contact assembly 82 shown more clearly in FIGS. 6 and 6B. An aluminum mounting ring 84 having a silver-plated surface 86 is welded to each end of the cylinder 68. A silver-plated copper contact ring 88 having a surface 90 is sandwiched between the mounting ring 84 and an aluminum spring retainer ring 92 by a plurality of bolts 94, with the silver-plated surfaces 86 and 90 held in contact with each other. Slots 66 are also cut into the ring 84 and cylinder 68 to minimize the detrimetal effects of differential thermal expansion, in the same manner as previously described with relation to the fixed conductors 20 and 22.

A plurality of contact finger assemblies are circumferentially arranged around the interior of the contact assembly 82 and are held between the contact ring 88 and the spring retainer 92. The contact finger assemblies are similar to those described in the aforementioned copending U.S. Patent Application Ser. No. 801,122 (W.E. 47,168). Each of the finger assemblies comprises a silverplated copper finger 96 shaped to provide a pivot point 98 and a slot 100 into which is press fitted a helical spring 102. The fingers 96 are made from sliced extrusions, although powder metallurgical techniques or other machinery methods may be satisfactory. The finger assemblies are movably inserted into the contact assembly 82 with the pivot point 98 seated against a corner of the contact ring 88 and the spring 102, under compression, having its free end inserted into a retaining groove 104. The angle of the slot 100 in the finger 96 results in two spring force components acting on the finger 96; one which pushes the contact pivot 98 tightly into the corner of the contact ring 88, and the other which pushes the finger radially inward (downward in FIG. 6B) exerting force on the contact mating ring 62 of the corresponding fixed center conductor 20 or 22, when the switch is in the closed position. This positioning of the spring results in about 90% of the spring force pushing toward the pivot point, resulting in very little power loss at this point, and about 10% of the spring force pressing the finger 96 against the ring 62. The force pressing the finger 96 against the ring 62 does not vary greatly with contact position, as motion about the pivot 98 within the limits allowed for contact travel does not appreciably change the spring length. The groove 104 in the spring retainer 92 positions the springs correctly and preloads the springs by the proper amount. Since the diameter of the springs 102 and the thickness of the fingers 96 are about equal, the finger assemblies can be placed side-by-side with very little space between them (as shown in FIG. 6), resulting in a maximum number of contacts around the contact assembly. Such a system results in low losses, eliminates the need for shunts, contains a large number of individual contacts, is very simple having only two moving parts, requires minimal opening and closing forces, allows easy replacement of individual contacts merely by compressing the spring 102 and removing the finger assembly, and yet provides extremely high current withstand ratings.

Figure 6A:
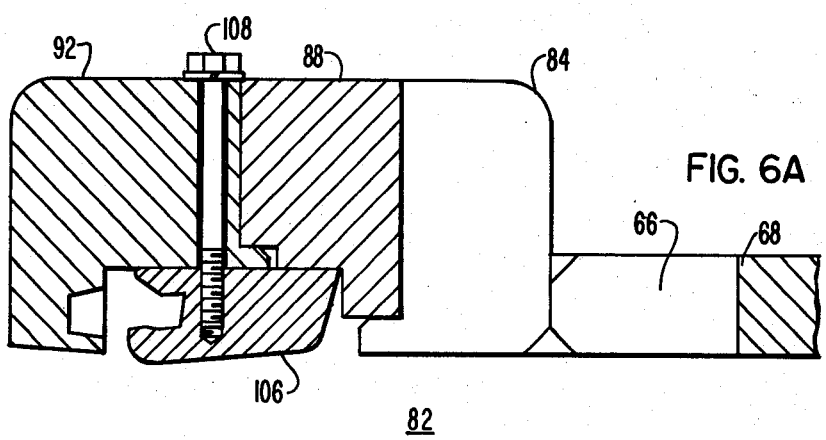
FIG. 6A is a detail sectional view of a portion of the telescoping sleeve assembly of the switch taken along the line VIA—VIA of FIG. 6, to show an alignment pad of the switch contacts.

As can be seen in FIGS. 6 and 6A a plurality of contact stabilizer pads 106 are symmetrically arranged about the contact assembly 82. Each of the pads 106 has the same cross section as the fingers 96 (and may be made from the same extrusion) but is twice the thickness. Each of the pads 106 is fixedly secured to the contact assembly 82 by screws 108. The pads 106, which do not include pressure springs 102 as do the fingers 96, are drawn up tightly against the inner surface of the contact assembly 82 by the screws 108. The pads 106 serve two functions, in that they maintain contact alignment at all times, particularly during opening and closing operations, and also serve as locator points to guide the telescope sleeve 24 onto the contact rings 62. The need for apertured contacts and a stabilizer ring, as described in the aforementioned U.S. Patent Application Ser. No. 801,122, is thus eliminated.

Figure 5A:
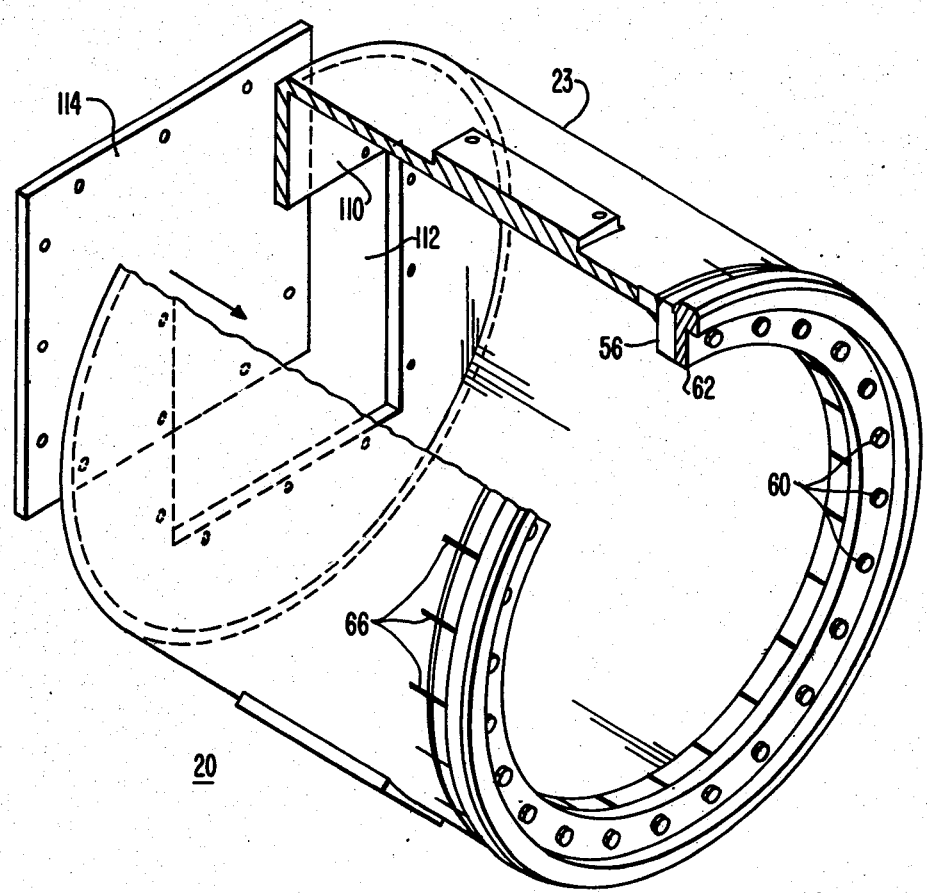
FIG. 5A is a perspective view, partially cut away, of a fixed center conductor member of the switch shown in FIGS. 1 through 3.

As can be seen in FIGS. 1 and 5A, each of the fixed conductors 20 and 22 comprises an aluminum cylinder 23 and an aluminum end plate 110 having a square access port 112 and a cover plate 114. An I-beam 115 (FIG. 2) welded to the cylinder 23 of each first conductor section 20 supports the right angle worm drive mechanism 40 which is directly driven by an interior drive shaft 116 coupled through insulators 120 and bushings 121 to the drive shaft 38. Universal joints 122 in the interior of the center conductor 20 and flexible couplings 124 between the phases 9, 10, and 11 of the switch assembly are provided to correct for minor misalignment.

The output of the worm drive mechanism 40 (FIG. 2) is the jack screw 42 which is engaged by the threaded member 44 attached to the end of the tube 46 in the sleeve cylinder 68. Actuation of the motor drive means 36 causes rotation of the drive shafts 38 and 116 which in turn cause rotation of the jack screws 42. Motion is thus imposed on the threaded member 42 causing the entire telescoping sleeve 24 to move along the rails 74. Microswitches 125 located on brackets attached to the plates 32 deactivate the motor drive means 36 when the sleeve assembly has travelled the required distance.

A typical switch constructed as described above has a housing 12 having a diameter of approximately 48 inches and a center conductor diameter of 28 inches. Approximately 350 contact fingers are circumferentially arranged around the interior of the contact assembly 82. The switch has been designed to carry a continuous current of 20,000 A at a voltage of 22,500 V, and has successfully sustained a test current of 490,100 peak amperes. It is believed that the switch can successfully withstand peak currents of as high as 1,000,000 amperes.

The disclosed switch provides superior structural and electrical integrity in the presence of extremely high fault currents yet allows safe and convenient maintenance procedures. In addition, the switch provides a greater number of individual contact points between the terminals of the switch while exhibiting a lower manufacturing cost than the prior art.

We claim:

1. An isolated phase bus disconnect switch comprising:
   a housing of conductive material, said housing comprising an access port for maintenance and inspection;
   a fixed center conductor disposed within said housing and electrically insulated therefrom;
   a movable center conductor disposed within said housing and electrically insulated therefrom, said movable conductor cooperating with said fixed conductor to perform a switching function therewith;
   a cover of conductive material removably covering said access port;
   a conductive gasket of metal braid disposed between said housing and said cover; and
   means for applying contact pressure upon said cover, said conductive gasket, and said housing to provide a low resistance electrical path therethrough.

2. An isolated phase bus disconnect switch as recited in claim 1 wherein said gasket comprises coated metal braid.

3. An isolated phase bus disconnect switch as recited in claim 2 wherein said housing and said center conductors are generally cylindrical in shape, said center conductors are coaxially disposed in said housing, and said cover is curved.

4. An isolated phase bus disconnect switch as recited in claim 3 wherein said conductive gasket comprises silver-coated copper braid.

5. An isolated phase bus disconnect switch as recited in claim 4 wherein said housing and said cover are constructed of aluminum, and the portions of said housing and said cover which are in contact with said conductive gasket are coated with silver.

6. An isolated phase bus disconnect switch as recited in claim 3 wherein said conductive gasket comprises braided tinned copper.

7. An isolated phase bus disconnect switch as recited in claim 6 wherein said cover is a rectangularly shaped portion of a cylinder which, when installed upon said housing, is substantially coaxial with said housing, and said conductive gasket runs along the sides of said cover which extend in a circumferential direction.

8. An isolated phase bus disconnect switch as recited in claim 6 comprising a resilient sealing gasket disposed between said housing and said cover.

9. An isolated phase bus disconnect switch as recited in claim 6 wherein said sealing gasket is disposed between the edges of said cover and said conductive gasket.

* * * * *